April 15, 1958 W. W. PHARIS 2,831,063

SELECTOR-REPEATER

Filed Jan. 20, 1955 5 Sheets-Sheet 1

INVENTOR.
WILLIAM W. PHARIS
BY Johannes Whitesel
ATTORNEY

April 15, 1958 W. W. PHARIS 2,831,063

SELECTOR-REPEATER

Filed Jan. 20, 1955 5 Sheets-Sheet 2

April 15, 1958 W. W. PHARIS 2,831,063

SELECTOR-REPEATER

Filed Jan. 20, 1955 5 Sheets-Sheet 4

2,831,063
Patented Apr. 15, 1958

2,831,063

SELECTOR-REPEATER

William W. Pharis, Rochester, N. Y., assignor, by mesne assignments, to General Dynamics Corporation, a corporation of Delaware Application January 20, 1955, Serial No. 483,138
18 Claims. (Cl. 179—18)

This invention relates to telephone circuits, and more particularly to an improved selector-repeater for use in intertoll dialing networks.

In the recent past, electromechanical telephone systems have been adapted to provide nationwide intertoll dialing service. In networks of this type, it is common for a big user or a central switching interest to assign code names to each telephone exchange. Usually, these code names are selected so that maximum efficiency may be had. It will be appreciated that in nationwide dialing a point is soon reached where the selection of non-conflicting code names becomes a major problem. It is not enough that a switch is able to use any of many possible code designations—it is also necessary for that switch to be able to respond to unique code situations. For example, one switch may be required to absorb a certain digit at one time, to switch through on that digit at another time, and perhaps to perform a still different function responsive to that same digit at a later time.

In addition to providing for unique code situations there will be a substantial savings if an incoming selector-repeater is provided with means for forwarding a toll marking and for returning answer supervision because, in the past, these features have required the use of an incoming trunk circuit interposed between a trunk line and an incoming selector-repeater.

One object of this invention is to provide a new and improved selector-repeater.

A further object of this invention is to provide means for forwarding a toll marking from a selector-repeater in the case of incoming toll calls.

Another object of this invention is to provide a selector-repeater for use in nationwide intertoll dialing.

Still another object of this invention is to provide a selector-repeater having a switch which is adapted to cut through on some levels, to drop-back on some levels, to step-out to overflow and return busy tone on some levels, to drop-back and unlock on certain levels, to drop-back and be used after unlock on certain levels, and to cut-through, step-out to overflow or drop-back on the same digit depending upon the position of that digit in a given directory number.

This invention accomplishes the above cited and other objects by means of a step-by-step switch which is provided with an auxiliary brush and associated bank contacts. Each of the auxiliary bank contacts is wired selectively according to the function to be performed on that level depending upon the position of a given digit in a directory number. The flat-type switch sold under the well known trade-mark "XY" provides one example of a suitable switch, although, any other suitable switch may be used also.

Toll marking is forwarded from the selector-repeater under the influence of a slow-to-release relay that is operated responsive to the transmission of digit pulses over a trunk line and into the selector-repeater during the time that the switch circuit is acting as a repeater. Answer supervision is given by means of a supervisory relay in the selector-repeater circuit which is operated to reverse the direction of battery flow from the selector-repeater over the trunk line to a distant calling office.

The above cited and other objects will be apparent from a study of the attached drawings in which.

The office battery has been shown throughout the drawings by means of simple plus (+) and minus (−) signs. As is the case in most telephone systems, the positive terminal of the battery is described as being connected with ground; therefore the terms "(−) battery" and "ground (+)" are used throughout the specification. It should be understood that this or any similar arrangement could be used.

BRIEF DESCRIPTION

Figure 1:
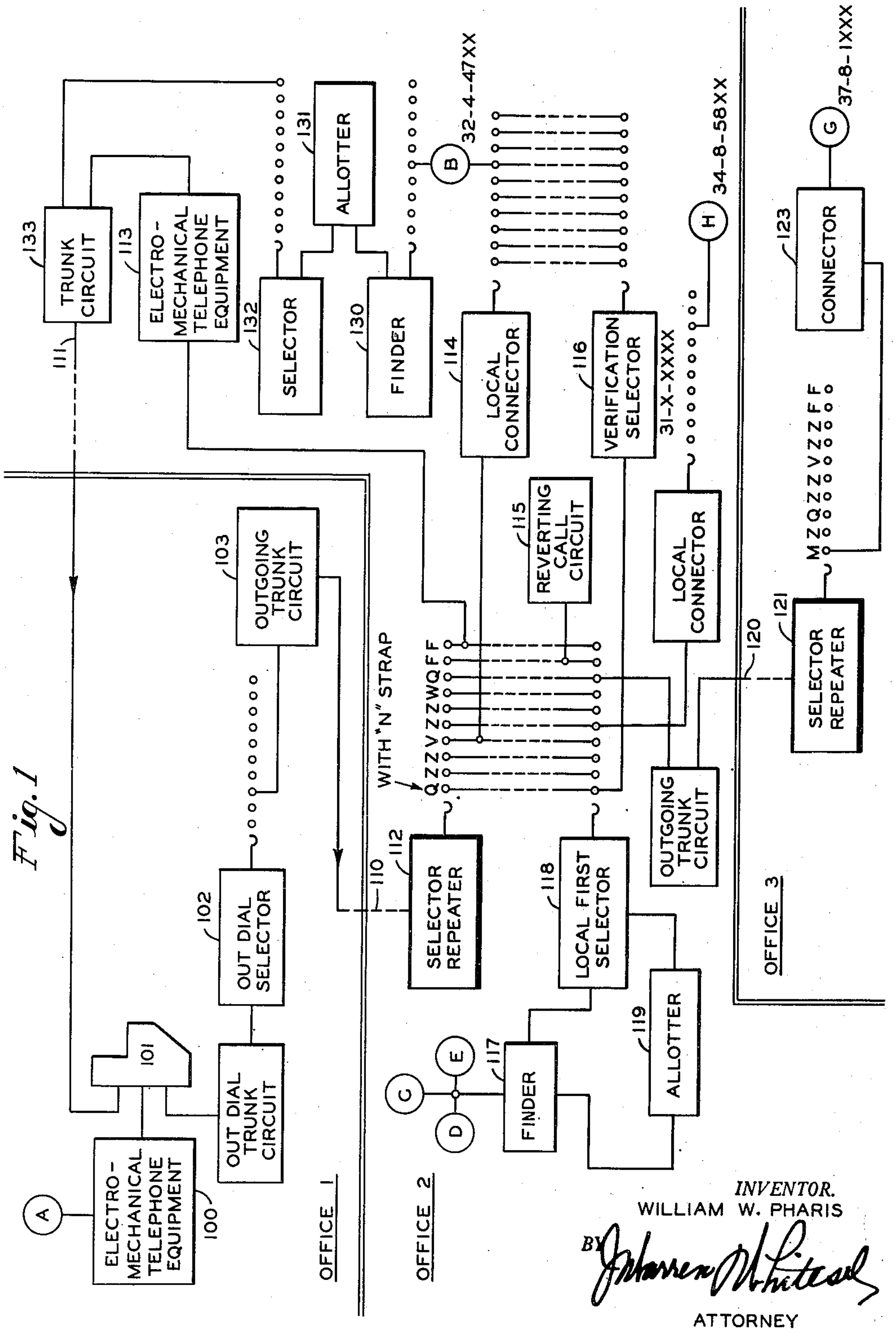
Fig. 1 shows a telephone system by means of a block diagram trunking lay-out. The selector-repeaters enclosed in heavily inked boxes are shown in the remainder of the drawings.

Briefly, the principal features of this invention relate to a toll and local telephone system of the type that is found in the trunking diagram of Fig. 1. Primarily, the invention relates to selector-repeaters 112 and 121 which are alike except for the strapping and wiring on the XX or level marking bank of contacts. Each of these selector-repeaters is designed to be connected directly to the wires of an incoming trunk line without having to go through an intervening incoming trunk circuit as is conventional. As will be pointed out below in the detailed description, this trunking arragement is made possible by a selector-repeater adapted to return reverse battery supervision and to forward toll markings.

Fig. 1 shows how different types of calls may be completed in this manner. For example, interoffice calls may originate in office 1 from a toll operator position 101. Then, the call is extended through an outdial trunk circuit, outdial selector 102, outgoing trunk circuit 103, one-way trunk line 110 and selector-repeater 112, there being no incoming trunk circuit between the incoming end of trunk line 110 and selector-repeater 112.

From this point, the call progresses in different manners depending upon the numerical value of the digits received. That is, the step-by-step switch associated with selector-repeater 112 is driven to a particular level responsive to a digit transmitted from toll board 101. If that level is marked by wiring M, the switch cuts-through and searches in its secondary direction, but if that level is marked by wiring W the switch drops-back. Wiring Z causes the switch to drop-back until an unlocking digit has driven the switch to a level marked by wiring V, after which the levels marked by wiring Z may be used. Wiring V is used to cause the switch to drop-back and to unlock the first time that the switch is directed there and if dialed after unlock, wiring V causes the switch to cut-in and to hunt in its secondary direction. Each time that wiring F marks the level dialed, it causes the switch to step-out to overflow because calls through this level are not of the type that a toll operator should make; therefore, it is obvious that she has dialed a number incorrectly. Wiring Q is provided with two options by means of straps P and N. In either case, wiring Q causes the switch to cut-in in its secondary direction if dialed before unlock. If the switch has unlocked responsive to being directed to a level marked by wiring V and thereafter is directed to a level marked by wiring Q, it will drop-back if strap P is used and will hunt-out to overflow if strap N is used.

Fig. 1 is a block diagram to illustrate these various options as actually used. For example, on calls from subscriber A to subscriber G, the operator dials the numbers 37–8–1XXX. The digit "3" directs outdial selector 102 to the third level thereby giving access to selector-102 to the third level thereby gving access to selector-repeater 112. The second digit "7" directs the switch associated with selector-repeater 112 to the seventh level which is marked by wiring W; therefore the switch drops-back. The third digit "8" directs the switch to a level marked by wiring Q. Since no unlocking digit has been dialed as yet, the switch hunts-out in its secondary direction for an idle trunk leading to office 3. The fourth digit "1" causes the switch associated with selector-repeater 121 to step in its primary direction to its first level which is marked by wiring M where the switch cuts-in and hunts in its secondary direction. The last three digits may be appropriate digits for directing the switch associated with connector 123 to seize the called local line.

In a similar manner, other calls may be traced through the block diagram of Fig. 1 to determine how the switches may be operated.

During dialing, shunt relay 240 (Fig. 2) pulls-up on the first pulse in each digit pulse train and continues to hold due to its slow release characteristics until the last pulse in that pulse train has ended. During this interval (−) battery is connected to conductor HS1 to forward a toll marking to the succeeding equipment. For example, on toll calls, delayed or controlled ringing may be required. In this case, the (−) battery marking on conductor HS1 causes the connector to cancel its automatic ringing feature. Once the call is completed, supervisory relay 220 operates its uppermost contacts to give reverse battery answer supervision.

DETAILED DESCRIPTION

It is thought that a more complete understanding will be had by a detailed description of selector-repeaters 112 and 121, the circuits for which are shown in Figs. 2–5.

*Call from subscriber A to subscriber G*

Figure 5:
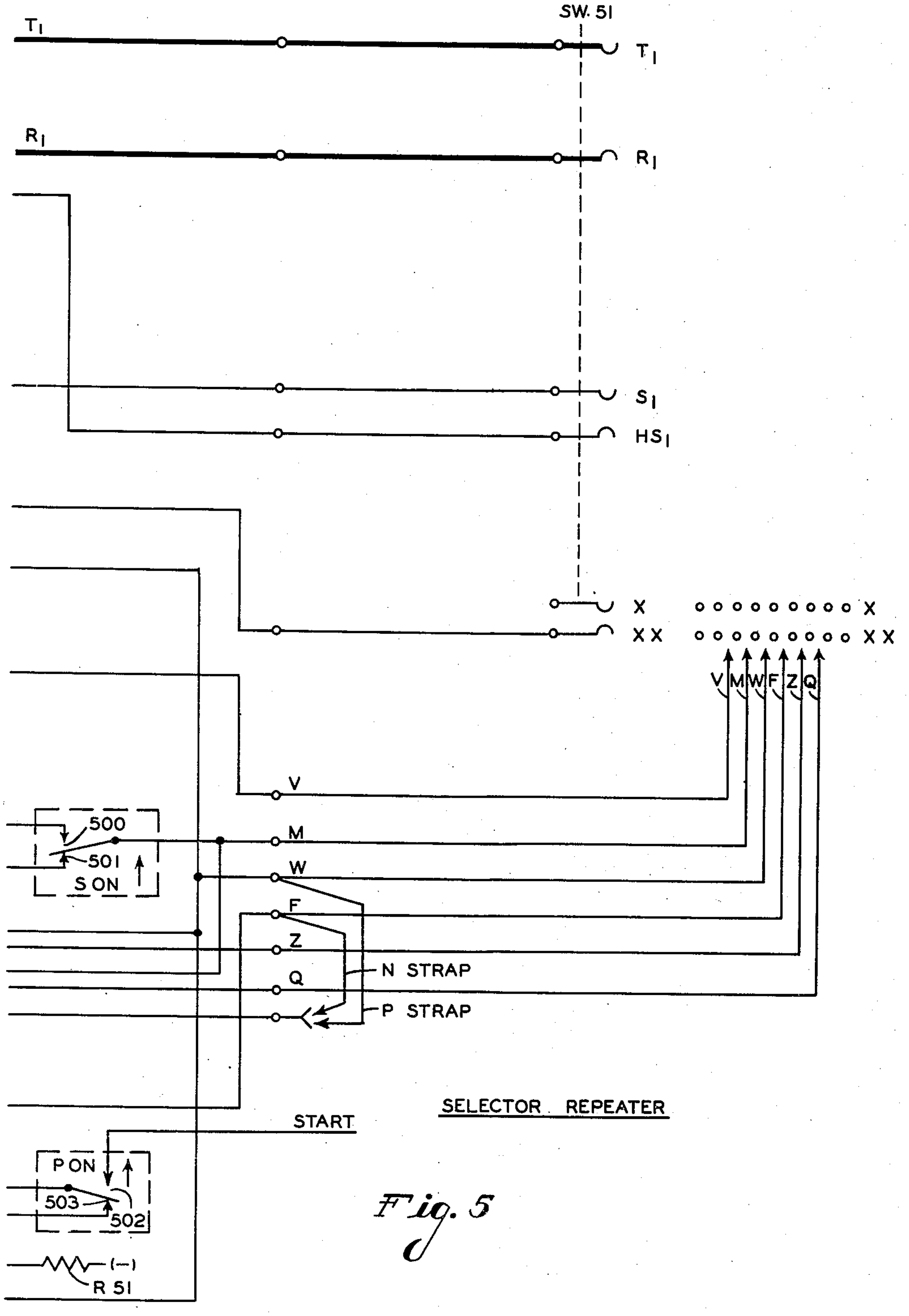

In a connection of the type exemplified by a call from subscriber A to subscriber G, a switch operation is completed through selector-repeaters 112 and 121. This operation requires both selector-repeaters 112 and 121 to switch through on the first digit dialed into each. Selector-repeater 112 switches through on a level marked as shown in Fig. 5 by the wiring Q while selector-repeater 121 switches through on a level marked as shown in Fig. 5 by the wiring M.

Figures 2, 6:
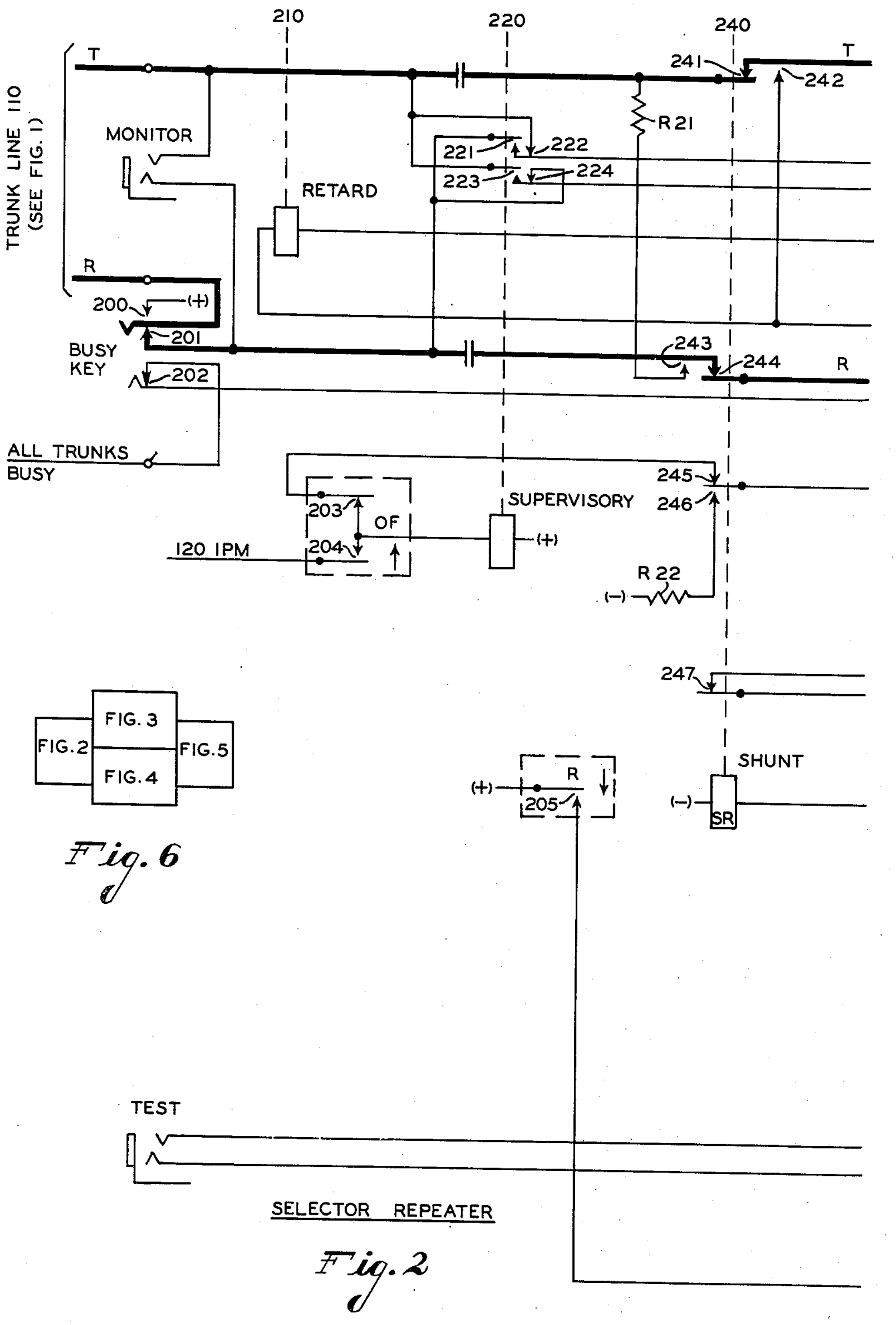
Figs. 2–5 show a complete selector-repeater.
Fig. 6 shows the manner in which the drawings should be arranged to provide a complete and operative circuit.
Figure 3:
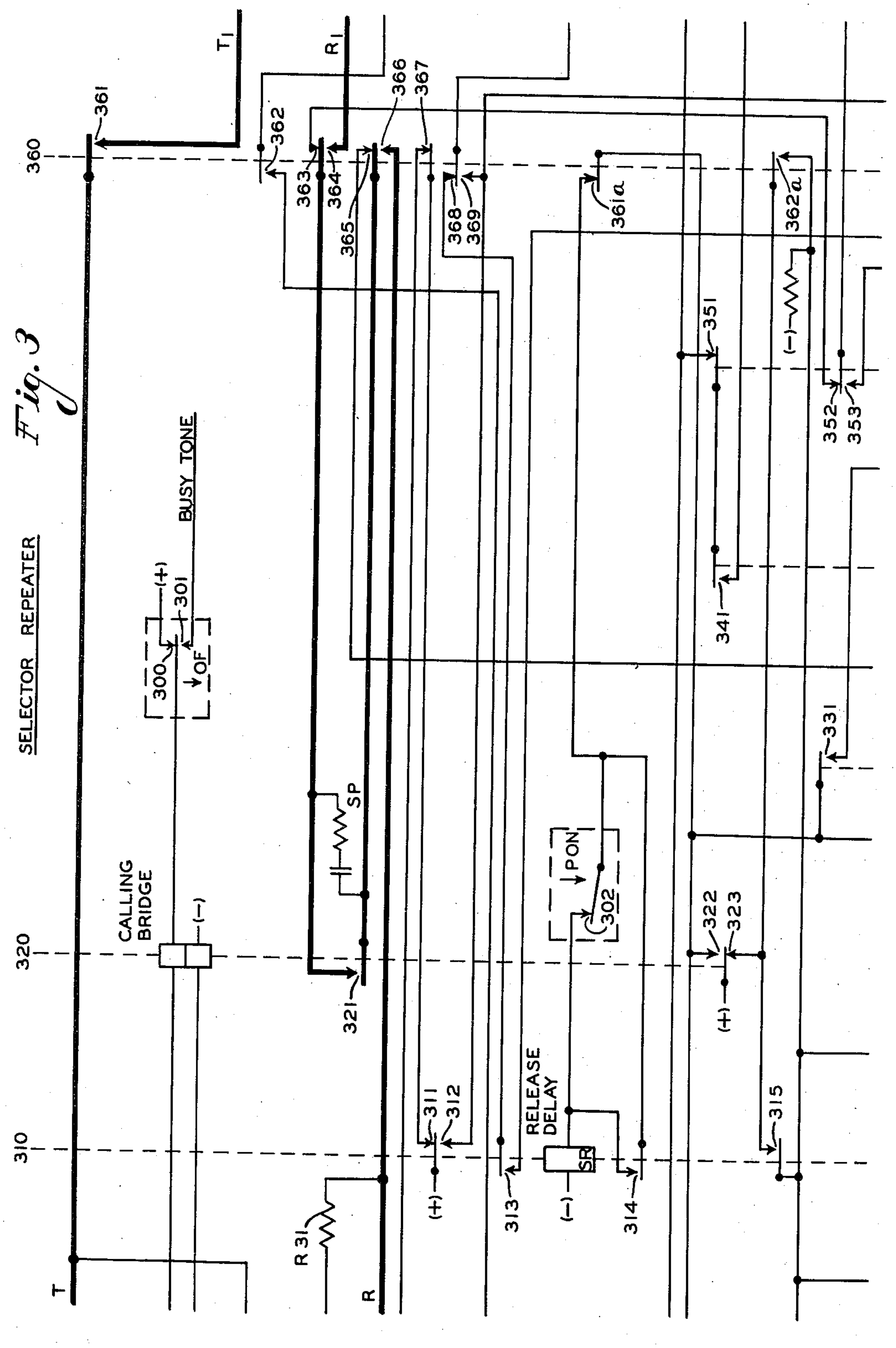
Figure 4:
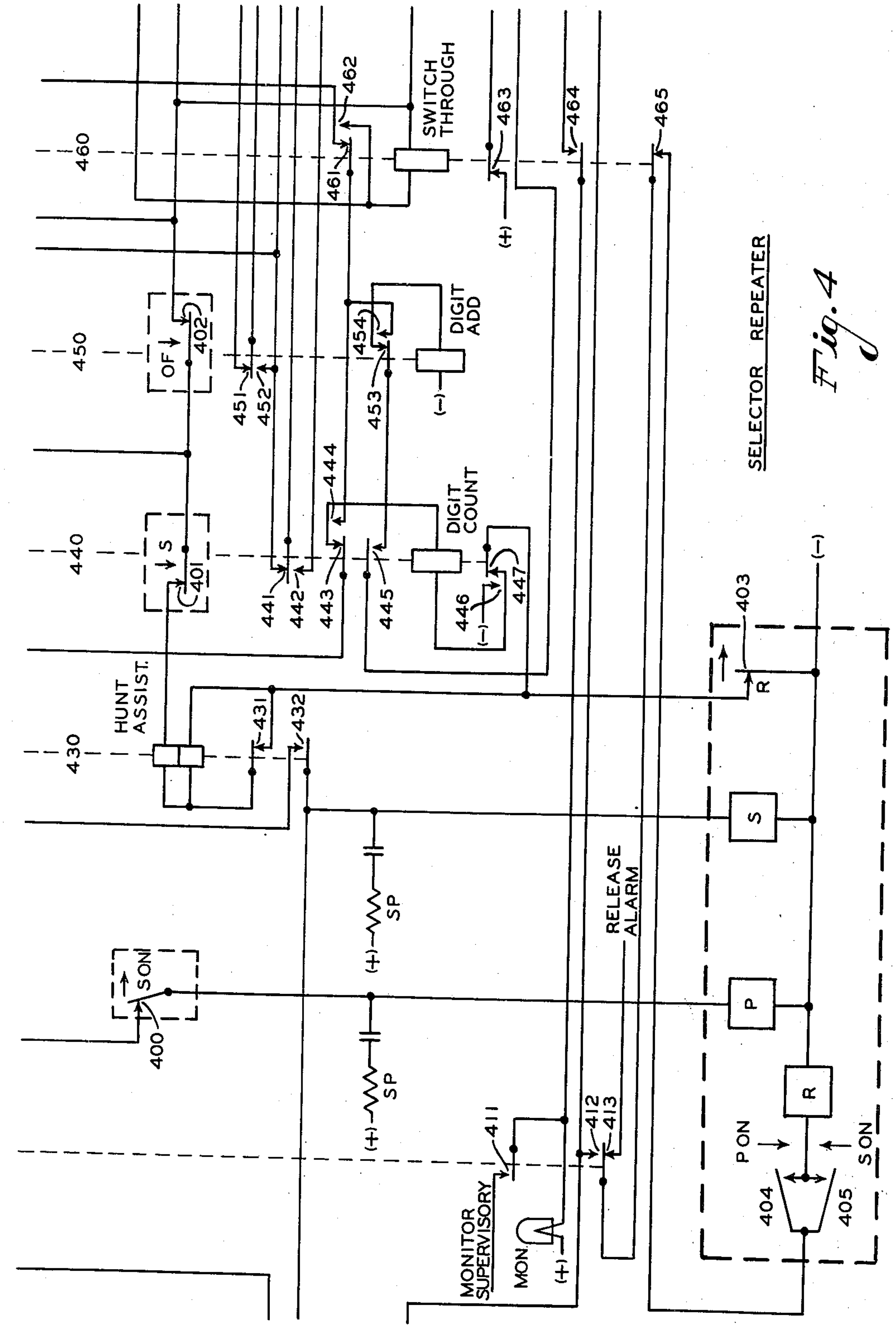

*Seizure.*—More specifically, selector-repeater 112 is seized when a loop is completed in any well known manner (not shown) across the incoming end of trunk line conductors T and R, upper left-hand corner of Fig. 2. This loop is completed to operate calling bridge relay 320 to mark the initiation of a call. Later, this relay will also respond to digit pulses thereby causing the switch SW–51 to step in its primary direction or thereby to repeat the digit pulses to other apparatus, such as selector-repeater 121 and connector 123, for example. The circuit for operating calling bridge relay 320 may be traced from ground (+), through overflow springs 300, the upper winding of calling bridge relay 320, normally closed contacts 222, tip conductor T, the equipment leading back to the calling operator's switchboard, ring conductor R, normally closed contacts 201 and 224, and the lower winding of calling bridge relay 320 to (−) battery. When relay 320 operates, contacts 321 close to prepare a pulsing path to the distant exchange, and to prepare for digit add and digit count operations. These functions will be explained later. Contacts 322 close to operate release delay relay 310 and to furnish a holding ground for other relays.

Release delay relay 310 is operated over the circuit which may be traced from ground (+), through contacts 322, 361*a*, primary off-normal contacts 302, and the winding of release delay relay 310 to (−) battery. The purpose of relay 310 is to maintain the digit count and add relays 440 and 450 and to control shunt relay 240 when the circuit is not in use. There is no reason to return a busy marking to preceding equipment under the influence of release delay relay 310 as is done in most selector circuits of the type that is used in the telephone system for which this circuit is designed, because selector-repeater 112 (Fig. 1) may be seized only over trunk line 110; therefore, the only place in the immediately preceding circuits that a busy marking is required is in the switch banks of outdial selector 102 (Fig. 1). This marking is provided by outgoing trunk circuit 103.

Returning now to the operation of release delay relay 310 (Fig. 3), contacts 311 open to remove the ground (+) marking from the all trunks busy conductor. The purpose of this conductor is to record the length of time during which calls cannot be completed due to the fact that all equipment is busy. That is, each circuit that is similar to the subject selector-repeater circuit is provided with a ground (+) marking similar to that extended over contacts 311, each selector-repeater being arranged to remove this marking as it becomes busy. When the last of these ground (+) markings is removed, the all trunks busy conductor is opened and a relay is released. A circuit is completed responsive to this release for operating a meter periodically thus recording the total elapsed time that all equipment is busy. The circuit to the all trunks busy conductor includes contacts 311, 367 and 202. Contacts 312 close to prepare for digit adding and digit cancelling, which is explained later. Contacts 313 close to extend the marking on sleeve conductor S1 to control switchthrough relay 460 later. Release delay relay 310 closes its locking contacts 314, thereby maintaining itself in its operated condition independently of primary off-normal contacts 302 since these will open responsive to the first step taken by the switch in its primary direction. Contacts 315 close to prepare a circuit for the operation of shunt relay 240 throughout digit pulsing. Contacts 411 close to connect a (−) battery marking (not shown) supplied over the monitor supervisory conductor to light monitor lamp MON. This lamp glows brilliantly at this time to indicate that the selector-repeater has been seized but has not yet switched through. Contacts 412 open and 413 close to prepare part of the release circuit that is to be described later.

The switch is now in a seized but unoperated condition and nothing further happens until the calling operator transmits suitable digit pulses.

*Digit pulsing.*—When the calling operator uses her digit transmitting device, such as a dial or key sender, for example, a plurality of digit pulses are transmitted into the selector-repeater. These digit pulses are in the form of breaks or open pulses in the loop completed across conductors T and R, through trunk line 110 and outgoing trunk circuit 103. That is, as the digit transmitting device operates, the loop is opened and closed a certain number of times depending upon the digit dialed, for example, in the case of the digit "7," the loop is broken seven times. Responsive to each break in the loop current, calling bridge relay 320 is released and reoperated to open and close contacts 322 and 323.

The first time that calling bridge relay 320 restores, a circuit is completed for operating shunt relay 240. This circuit may be traced from ground (+), through contacts 323, 315 and the winding of relay 240 to (−) battery. The purpose of this relay is to improve pulsing characteristics by opening the talking conductors at contacts 241 and 244, thus eliminating the impedance of retard coil 210 which normally is connected across the talking conductors. Contacts 243 close to terminate the talking conductors T and R which are incoming to the upper left-hand corner of Fig. 2. This termination includes contacts 243 and resistor R21. Contacts 246 close to forward a (−) battery toll marking via (−) battery, resistance R22, contacts 246 and 362 to extra sleeve conductor HS1. This marking has no function at present while the switch circuit is acting as a selector. Later it serves to adapt succeeding equipment to toll call operation during the repeater-like operation of circuit 112. For a description of this, see the section entitled "Toll marking." Contacts 247 open to prevent any inadvertent switch operation responsive to the XX brush stepping over but not stopping on various terminals in the XX bank which may be marked by any of the various wirings shown. Each time that a digit pulse is terminated, shunt relay 240 is deenergized but not released because contacts 323 open and reclose immediately and because relay 240 has slow release characteristics. After the termination of the last digit pulse in each pulse train, shunt relay 240 is not reenergized within its slow release period by a reclosure of contacts 323; therefore, it releases.

Also responsive to each digit pulse that releases calling bridge relay 320, a circuit is completed for operating primary magnet P. This circuit is completed from ground (+), through contacts 323, 315, secondary off-normal contacts 400, and the winding of primary stepping magnet P to (−) battery. Each time that magnet P operates, the switch is driven one step in its primary direction to move wipers T1, R1, S1 and HS1 opposite the level that was dialed by the calling subscriber. Simultaneously therewith, auxiliary brushes X and XX are moved over the X and XX terminals to indicate the level to which the switch is directed by the digit received from the calling subscriber. Brush and bank X have no function in this circuit; nevertheless, they are shown since they are part of a flat-type switch of the type used in the particular embodiment of the invention shown in the drawing thus making their use or non-use a matter of some minor importance.

On the first step off-normal in the primary direction, the primary off-normal contacts shown in small dashed rectangles, marked "PON," are moved in the direction of the associated arrow. Contacts 404 prepare a release circuit, contacts 302 open since they are no longer needed after contacts 314 have closed, contacts 503 open since they are not necessary except on digit count and contacts 502 close to operate common equipment over the start conductor.

The next circuit function depends upon the marking associated with the particular level to which the switch was directed and on which it is left standing at the termination of the digit pulse train. That is, after contacts 323 are no longer opened and closed due to the receipt of digit pulses, a sufficient interval of time elapses and shunt relay 240 releases to close contacts 247 thereby completing a circuit from the XX brush and one of the wirings V, M, W, F, Z or Q depending upon how the levels are wired in the XX bank.

*Wiring W*.—Since it has been assumed that the present call is to subscriber G, whose number is 37-8-1XXX, the first digit "3" set outdial selector 102 to seize selector-repeater 112 and the second digit "7" directed the switch associated with selector-repeater 112 to the level marked by wiring W. This level is equipped to prevent the switch from cutting-through regardless of when it may be dialed. In this case, a circuit is completed for operating release magnet R thereby restoring the switch to its normal position. This circuit may be traced from (−) battery, through the winding of release magnet R, primary off-normal contacts 404, resting contacts 465, operated contacts 412, wiring W, brush and wiper XX, normal contacts 247 and operated contacts 322 to ground (+). Magnet R operates, the switch returns to normal and nothing further happens until the calling subscriber dials the next digit and the switch is directed to a level which may be marked by still different wiring.

*Wiring Q before unlock*.—Since it is assumed that the third digit in the directory number of subscriber G is the number "8," selector-repeater 112 is reoperated in the manner explained above in the section entitled "Digit pulsing." This time the level reached in the primary direction is marked by wiring Q. Since the switch has not been directed previously during this particular call to the level marked by wiring V, the switch is said to be in a locked condition, or stated otherwise, the marking of wiring Q has been reached before unlock. In this condition, the switch hunts out for an idle trunk in its secondary direction. If one is found, the switchthrough relay operates and selector-repeater 112 functions thereafter as a pulse repeater.

More specifically, a circuit may be traced to operate hunt assist relay 430 via (−) battery, release magnet interrupter contacts 403, contacts 431, the upper winding of relay 430, secondary magnet interrupter contacts 401, overflow contacts 402, secondary off-normal contacts 501, contacts 441, wiring Q, bank and brush XX, contacts 247 and 322 to ground (+).

It might be noted that hunt assist relay 430 has a self-shorting lower winding. This is because the relay has a low resistance upper winding to provide fast operation responsive to which the inductive resistance of the lower winding is connected in series with the upper winding to hold the relay operated while reducing the current flow through the upper winding to avoid burning-out that winding.

*Secondary switch motion*.—Hunt assist relay 430 operates. Its function is to provide an interlock between the mechanical movement of the switch and the electrical operation of the secondary stepping magnet S, thus insuring a complete mechanical step on each switch operation. A circuit is completed for operating secondary stepping magnet S when hunt assist relay 430 closes its contacts 432. This circuit may be traced from (−) battery, through the winding of magnet S, operated contacts 432 and 322 to ground (+). The switch moves one step into the level which has been selected. Secondary off-normal contacts 501 and 400 open while secondary off-normal contacts 500 and 405 close. Also, secondary interrupter contacts 401 open to release hunt assist relay 430. This, in turn, opens contacts 432 to release secondary stepping magnet S. The hunt assist relay and secondary stepping magnet cooperate in this manner to drive the switch. Neither can be operated or released until the other has been operated and released. This insures a complete mechanical step every time. Contacts 331 are provided to maintain a ground marking on conductor S1 during the time interval that the switch is actually stepped in the secondary direction, thus assuring against any double seizure. This ground marking may be traced from ground (+), through contacts 322, 331, overflow contacts 402, operated contacts 313, and released contacts 368 to brush S1. Naturally this ground marking is removed when hunt assist relay 430 restores to open contacts 331.

The following operation depends upon whether or not a busy trunk is connected with the first step. For example, assuming that a busy trunk is encountered, brush S1 is marked with a ground potential. This marking is extended through normal contacts 368, operated contacts 313, normal contacts 402, 401, the upper winding of hunt assist relay 430, contacts 431 and release magnet interrupter contacts 403 to (−) battery.. This causes hunt assist relay 430 to operate, contacts 432 to close, secondary magnet S to operate, hunt assist relay 430 to release, and secondary magnet S to release, in the manner explained above, to cause the switch to take a second step. This cycle of operation between the hunt assist relay and secondary magnet S continues on each step until brush S1 encounters an absence of ground marking, thus indicating an idle trunk, or until the switch reaches the extremity of its secondary motion, in which case an overflow busy signal is retuned in the manner explained below in the section entitled "Overflow."

When an idle trunk is found as indicated by an absence of ground on conductor S1, there is no circuit for reoperating hunt assist relay 430; therefore, switch motion stops. The selector-repeater is switched through by the operation of switchthrough relay 460. During trunk hunting, this relay is shunted by ground applied to both sides of the winding, the shunt circuit being traced from the busy ground on brush S1 over normal contacts 368, operated contacts 313, through the winding of switchthrough relay 460, operated secondary off-normal contacts 500, contacts 441, wiring Q, bank and brush XX, released contacts 247 and operated contacts 322 to ground (+). When the idle trunk is encountered, switchthrough relay 460 is no longer shunted by this busy ground encountered by brush S1. A circuit is then completed for operating this relay from (—) battery, through release magnet interrupter contacts 403, contacts 431, the upper winding of hunt assist relay 430, secondary interrupter contacts 401, overflow contacts 402, the winding of switchthrough relay 460, secondary off-normal contacts 500, contacts 441, wiring Q, bank and brush XX, normal contacts 247 and operated contacts 322 to ground (+). The circuit values are such that hunt assist relay 430 will not operate in this circuit, but that switchthrough relay 460 will.

*Switchthrough.*—When relay 460 operates, contacts 361, 364 and 366 close to complete a talking circuit from conductors T and R through conductors T1 and R1, respectively. Contacts 363 and 365 open to break a circuit which wil be explained below in a section entitled "Digit adding." Contacts 367 open a second point in the all trunks busy connector. Contacts 368 open and 369 close to connect the sleeve conductor S1 to a busy ground marking over a circuit which may be traced from sleeve S1, through contacts 369, 462, operated secondary off-normal contacts 500, contacts 441, conductor Q, bank and brush XX, resting contacts 247, and operated contacts 322 to ground (+). Contacts 361*a* open to restore release delay 310 since it need not be operated after the talking conductors have been switched through. Contacts 362*a* prepare the circuit for relay 240 after relay 310 restores. This circuit is maintained from contacts 323 throughout pulsing during the repeater operation. Contacts 463 open to remove the ground marking from the start conductor. Contacts 465 open to prevent any premature release of the switch. Contacts 464 close to connect monitor lamp MON to (—) battery through resistor R51. Since release delay relay 310 has now released and opened contacts 411, the monitor lamp glows dimly thus indicating switchthrough. Relay 310 also removes its ground (+) marking from the sleeve lead at contacts 312 thus leaving the switch under control of a busy ground marking (not shown) applied to sleeve S1 by a succeeding circuit.

*Repeater operation.*—The selector-repeater is now prepared to receive and repeat digit pulses from the calling operator position to the succeeding equipment, which is selector-repeater 121, in the case assumed. Responsive to each digit pulse, calling bridge relay 320 releases in the manner explained above in the section entitled "Digit pulsing." This, in turn, opens contacts 321, thereby breaking the pulsing loop to selector-repeater 121. This loop may be traced from conductor T1, through operated contacts 361, retard coil 210, resistor R31, operated contacts 366, pulsing contacts 321, operated contacts 364 and conductor R1 to office 3. Contacts 321 respond to each release of calling bridge relay 320 thereby repeating the digit pulses in each ensuing pulse train. On each dial pulse, when relay 320 restores, contacts 323 complete a circuit via contacts 362*a* to shunt relay 240 which operates on the first pulse of each digit pulse train and holds operated for the remaining pulses in that train since it is slow to release. Contacts 242 close a low resistance pulsing path via resistor R31 and an outgoing trunk to switches ahead. Contacts 241 and 244 remove the calling bridge from the pulsing path to switches ahead, and contacts 243 provide termination for the calling line.

*Toll marking.*—On occasions involving calls through a selector-repeater, it may be necessary to forward a toll marking. I use the term "forward" to indicate that the marking is extended in the direction of the call, i. e., toward the called party. It is thought that the term "toll marking" is well known in the art as meaning a control potential used to identify toll or charge calls as distinguished from free service calls. Different systems may be adapted to utilize different types of control potentials; therefore, the important feature is that a signal is forwarded—not the specific ground, battery or tone potential that may be used. A toll marking is necessary when some equipment in the telephone system must perform unique or different functions during toll calls. For example, on toll calls it may be necessary to prevent the connector from ringing automatically and to provide a means by which the operator may selectively ring a called subscriber at a time of her choosing. For this purpose, conductor HS1 is noramlly arranged with a ground (+) marking extended through the winding of supervisory relay 220, contacts 203, 245 and 362 to conductor HS1. When shunt relay 240 operates, this ground (+) marking is switched to (—) battery through resistor R22 and the succeeding equipment is thereby set-up for toll operation. Naturally, a toll marking would neither be desired nor given in the case of local calls. Therefore, connector 114 is a switch which may be seized either from selector-repeater 112 in the case of toll calls or from local first selector 118 in the case of local calls. Connector 114 is arranged to provide for either local or toll operation depending upon whether toll marking is forwarded to it over conducotr HS1.

*M wiring.*—It has been assumed that the call has been extended to selector-repeater 121 and that the fourth digit will cause this switch to seize connector 123. The two selector-repeaters are the same except that selector-repeater 112 has an N strap while selector-repeater 121 has a P strap. Therefore, for the purposes of this section, it is assumed that selector-repeater 121 is shown in Figs. 2–5 and that conductors T and R connect with trunk line 120. Since it is also assumed that the fourth digit in subscriber G's directory number is "1," the switch associated with selector-repeater 121 is directed in its primary direction to the first level in the manner described above in the section entitled "Digit pulsing." At the end of the digit, the switch is left standing with brushes XX in contact with a terminal marked by wiring M. Therefore, a circuit is completed for causing the switch to take a first step in its secondary direction. The circuit for this operation may be traced from (—) battery, through release magnet interrupter contacts 403, normal contacts 431, the upper winding of hunt assist relay 430, secondary magnet interrupter contacts 401, overflow contacts 402, secondary off-normal contacts 501, wiring M, bank and brush XX, normal contacts 247 and operated contacts 322 to ground (+).

From this point the switch functions in the manner explained above in the sections entitled "Secondary switch motion" and "Switchthrough."

*Answer supervision.*—Means is provided for returning answer supervision responsive to answer by a called subscriber. I use the term "returning" to indicate that supervision is transmitted in a direction which is opposite to the direction in which a call is established, i. e., from the called subscrber toward the calling subscriber. The term "answer supervision" is well known in the art as meaning a signal that is transmitted to indicate the time at which certain circuit functions are to be completed, for example when to start conversation timing, trip a message register, etc. The important feature is that a signal is returned—not that the signal is in the form of a particular ground, battery, tone or the like. In greater detail, after connector 123 has been operated, the called party has been signaled and has answered, equipment in connector 123 (not shown) applies a (−) battery marking to conductor HS1, contacts 362, 245 and 203 to ground (+) through the winding of supervisory relay 220 which operates to open contacts 222 and 224 while closing contacts 221 and 223, thereby reversing the direction of battery flow over conductors T and R. This returns answer supervision to calling operator 101. That is, talking battery may now be traced from ground (+), through the upper winding of calling bridge relay 320, operated contacts 221, rest contacts 201, conductor R, the outgoing loop, and back over conductor T, operated contacts 223, and the lower winding of calling bridge relay 320 to (−) battery.

Conversation follows.

RELEASE

When the calling subscriber hangs up, the operator breaks the loop to calling bridge relay 320. Responsive thereto, contacts 322 open and the ground (+) marking is removed from the sleeve conductor S1. This marking formerly extended through contacts 369, 462, 500 (conductor M in the case of selector-repeater 121), contacts 441, conductor Q, band and wiper XX, contacts 247 and 322 to ground (+). When this ground is removed from conductor S1, subsequent equipment releases. Switch-through relay 460 restores. It formerly held over the circuit from contacts 322 through 247, brush XX, conductor M or conductor Q and contacts 441, as the case may be, contacts 500, the winding of switchthrough relay 460, overflow contacts 402, secondary magnet interrupter contacts 401, the upper winding of hunt assist relay 430, contacts 431, and release magnet interrupter contacts 403 to (−) battery. When switchthrough relay 460 releases, a circuit is completed for operating release magnet R, this circuit being from the release alarm conductor through contacts 413, 465, 404 and 405 in parallel, and the winding of release magnet R to (−) battery. Release magnet R operates and causes the switch to restore to normal. Release magnet interrupter springs 403 open to prevent any possible operation of hunt assist relay 430 at this time. Release magnet interrupters 205 also operate; however, they have no function at this time.

After the switch has returned to normal and the release magnet has restored, release interrupter springs also are restored and the switch is in its normal condition and ready for the next call.

OVERFLOW

On occasions, the switch may hunt in its secondary direction without finding an idle trunk in the manner described above in the section entitled "Secondary motion." In this event, the switch is stepped to the extremity of its secondary direction and a busy signal is returned to the calling operator. More specifically, overflow springs 402 open thus breaking the stepping path for hunt assist relay 430. Hunt assist relay 430 does not reoperate; hence, switch motion stops. Contacts 300 open and 301 close to transmit busy tone to the calling operator, thus indicating to her that the call cannot be completed. Contacts 203 open and 204 close to place operation of supervisory relay 220 under the sole control of a 120 impulses per minute interrupter. This means that supervisory relay 220 operates and restores 120 times per minute to reverse the direction of battery flow over the loop to the calling operator position at a corresponding rate of speed, thereby giving a flash busy supervision.

CALL FROM SUBSCRIBER A TO SUBSCRIBER B

Briefly, if subscriber A wishes to call subscriber B, he signals toll operator position 101 by means of any suitable means such as electromechanical telephone equipment 100, for example. Upon determining the destination of the call, the toll operator proceeds to key or dial 32–4–47XX. The first digit "3" is used to position outdial selector 102 to seize outgoing trunk circuit 103 and, in turn, trunk line 110. The second digit "2" causes the switch associated with selector-repeater 112 to step-out to the second level which is marked with wiring Z. At this point the switch 112 drops back to absorb the second digit since it has not been unlocked as yet. The third digit "4" causes the switch associated with selector-repeater 112 to step-out to the fourth level which is marked by wiring V. Again, the switch drops back; however, this time the selector-repeater is unlocked so that the next digit will be effective on all levels except those marked by wirings W, F or Q; hence, the fourth digit causes selector-repeater 112 to be effective if the switch is stepped out to any level marked by an M, V or Z wiring.

*Z wiring.*—Since it has been assumed that the call is destined for subscriber B (Fig. 1), selector-repeater 112 receives the digits "2" and "4" which directs its switch successively to levels marked by wirings Z and V. Selector-repeater 112 is seized and responds to incoming digit pulses in the manner described above in the section entitled "Seizure" and "Digit pulsing." At the end of the switch's first primary motion, wiper XX is left standing on a bank which is marked by wiring Z; therefore, a circuit is completed for causing the switch to drop-back and cancel that digit. More particularly, this circuit may be traced from ground (+), through contacts 322 on operated calling bridge relay 320, resting contacts 247, brush and bank XX, wiring Z, normal contacts 451, operated contacts 412, normal contacts 465, operated primary off-normal contacts 404, and the winding of release magnet R to (−) battery. Magnet R operates, the switch returns to normal, and the digit "2" has been canceled.

*V wiring, unlock.*—Next, switch 112 is directed to the level marked by wiring V. Once again, the switch is driven in its primary direction in the manner explained above in the section entitled "Digit pulsing." Brush XX is left standing on a level marked by wiring V. Therefore, a circuit may be traced from ground (+) on operated contacts 322, through normal contacts 247, brush and bank XX, wiring V, contacts 352, 363, 321, 365, 443, the winding of digit count relay 440, contacts 447 and 403 to (−) battery.

Digit count relay 440 operates and locks at its contacts 446. This is independent of release magnet interrupter contacts 403; therefore, digit count relay 440 does not release when the switch drops back presently. This operation of digit count relay 440 registers the occurrence of an unlocking digit which has driven the switch to a level marked by wiring V. Contacts 341 close to cause the switch to drop-back to its normal position, thus cancelling digit "4." The circuit for drop-back may be traced from ground (+), through contacts 322, 247, 351, 341, 412, 465, 404 and the winding of release magnet R to (−) battery. When the switch returns to normal, primary off-normal contacts 503 close. Now, a circuit may be traced from ground (+), through resting contacts 463, 503, operated contacts 445, rest contacts 453 and the winding of digit add relay 450 to (−) battery. Relay 450 operates and locks at its contacts 454. This locking path may be traced from (−) battery, through the winding of relay 450, contacts 454, 461 and 312 to ground (+). Digit add relay 450 closes its contacts 452 thereby connecting wiring Z to wiring M. Also, contacts 353 close to connect wiring V to wiring M. The switch is now in a condition such that it will switch through if the next digit directs the switch to a level which is marked by wirings V, M or Z. The circuit for causing hunt assist relay 430 to operate may be traced from (−) battery, through release magnet interrupter contacts 403, contacts 431, the upper winding of hunt assist relay 430, secondary magnet interrupter contacts 401, overflow contacts 402, secondary off-normal contacts 501, one of the wirings M, V or Z, as the case may be, bank and brush XX, normal contacts 247 and operated contacts 322.

On the other hand, wiring Q is arranged to prevent switchthrough if a level marked by it is dialed after unlocked by wiring V. That is, before wired V level is dialed, wiring Q is connected through contacts 441 to wiring M for switchthrough. After digit count relay 440 has operated responsive to an unlock digit, wiring Q is connected through contacts 442 to either wiring W or wiring F depending upon whether strap N or strap P is used, for a description of this see the section below entitled "Straps N and P."

The next digit in the directory number of subscriber B causes the switch to step-out to the fourth level where it switches through to seize an idle local connector 114 which then may be operated in any desired manner to seize and signal subscriber B. Release is as explained above.

CALLS INVOLVING F WIRING

Still another class of calls are those where toll operator 101 should not be given access at all. For example, a call of this type is illustrated by a reverting call using circuit 115. This circuit is used when a party line subscriber wishes to call a second subscriber on his same telephone line via a local switch train. For example, when subscriber C wishes to call subscriber E, subscriber C removes his receiver and his line is found by finder 117 operating under the influence of allotter 119. Local first selector 118 is directed by digits transmitted from subscriber C to the ninth level to which reverting call circuit 115 is connected. A tone is returned to calling subscriber C and he proceeds to follow the prescribed operation to control reverting call circuit 115 which in turn signals subscriber E in the well known manner. Naturally, the local switch train would not forward any toll marking as is done by selector-repeater 112. Still another type of call that the toll operator is prevented from making is the useless call wherein she would seize a "zero operator," i. e., dial "0" into selector-repeater 112 and seize her own switchboard over trunk line 111.

Since the toll operator has no occasion to make calls such as either a reverting call or a "zero operator" call, the ninth and tenth levels are marked by wiring F, thereby restricting these levels on all calls from the toll board but leaving the levels accessible to local first selector 118. By way of illustration, an attempted call from toll board 101 through a level marked by wiring F will be described next. When the switch associated with selector-repeater 112 is directed to a level that is marked by wiring F, a circuit is completed for stepping the switch into overflow, this circuit being traced from ground (+) on contacts 322, through contacts 247, brush and bank XX, wiring F, resting overflow contacts 402, secondary magnet interrupter contacts 401, through the upper winding of hunt assist relay 430, contacts 431 and 403 to (−) battery. Hence, the marking simulating a busy trunk marking is transmitted to hunt assist relay 430 on each step, thus causing the switch to step-out to overflow at which time a busy signal is returned to the calling operator in the manner explained above in the section entiled "Overflow."

VERIFICATION CALL

Still another call which is illustrated by the trunking diagram of Fig. 1 is a verification call. In this case, it is assumed that subscriber B calls toll operator 101 by any suitable means. For example, subscriber B may remove his receiver and responsive thereto finder 130 operates under the influence of allotter 131 to find the calling subscriber's line. Selector 132 is operated under the influence of digit pulses transmitted from calling subscriber B's station. A circuit then may be completed through trunk circuit 133 and trunk line 111 to toll operator position 101. She may wish to verify the identity of the subscriber who should be billed for the call; therefore, she asks subscriber B for his number. She dials to cause outdial selector 102 to seize selector-repeater 112; then she dials the digit "1" plus the number that was given to her. This sets outdial selector 102, the switch in selector-repeater 112 and verification selector 116 which is adapted to cut-in on busy lines. It seizes the line to subscriber B. Toll operator 101 may then converse with subscriber B over the circuit that she has set-up to determine whether she has been given the correct number as a toll charge.

STRAPS N AND P

As has been pointed out above, wiring Q is designed for use before an unlocking digit has directed the switch to a level marked by wiring V. If a level marked by wiring Q is dialed after an unlocking digit, the operator has made a mistake because the numbering scheme does not allow connections of this type; therefore, the call should not be completed. In some cases, it is best to return a busy tone so that the operator will try again. This assumes that she would not make the same dialing mistake twice. At other times it may be best to release the switch without further ado. It is for these reasons that the switch is provided with two options in the form of straps N and P. Either may be used in any switch; however, both cannot be used in a single switch.

In case the Q wiring is provided with the N strap and if the operator at toll board 101 should dial the Q marked level after having unlocked the switch, she would have made an error since this level would not be used on any call having this directory number. To review briefly, when the operator dials a level marked by wiring V, digit count relay 440 and digit add relay 450 are operated and locked in the manner explained above in the section entitled "V wiring." Since it is assumed that the operator incorrectly dials a level marked by wiring Q (and strap N) after unlock, a circuit is completed for causing the switch to step-out to overflow and to return a busy tone as an indication that an incorrect number has been dialed. More specifically, a ground (+) marking may be traced from operated contacts 322, through normal contacts 247, brush and bank XX, wiring Q, operated contacts 442, strap N, resting overflow contacts 402, secondary magnet interrupter contacts 401, the upper winding of hunt assist relay 430, contacts 431, release magnet interrupter contacts 403 to (−) battery. The busy marking at sleeve conductor S1 is ground (+) and since a ground (+) marking is now applied to wiring Q, strap N and contacts 402, it is seen that there is an exact duplicate of a busy trunk marking on each step. Therefore, the switch hunts out until it reaches the extremity of its secondary motion and busy tone is returned in the manner described above in the section entitled "Overflow."

Still another type of call is illustrated by a call where the strap P is used. When an unlocking digit is dialed, the switch drops back. Digit count relay 440 and digit add relay 450 operate and lock in the manner explained above in the section entitled "V wiring." If on the next digit the switch associated with selector-repeater 121 is driven to a level marked with wiring Q and strap P, contacts 442 are closed so that, in effect, wiring Q becomes the same as wiring W and the switch drops back in the manner explained above in the section entitled "Wiring W."

MISCELLANEOUS

Various elements have been shown in the drawings which are not immediately material to the invention and have not been explained heretofore. For example, several resistor-capacitor circuits have been labeled "SP." These are spark protection circuits and are adapted to protect contacts that operate during digit pulsing. A monitor jack and a test jack have been shown to facilitate maintenance of the system. Busy key contacts 200–202 have been shown to provide means for marking the selector-repeater busy during intervals when it may be subject to repair.

The foregoing specification has been designed to illustrate the invention and one type of circuit which might be used to accomplish the desired objects. Therefore, it is my intention to include in the attached claims not only the specific apparatus shown in the drawings, but also all modifications and embodiments thereof which may fall within the true scope of my invention.

What I claim is:

1. A telephone system comprising at least two offices, a one-way trunk line extending between said offices, means for extending calls over said trunk line in said one-way direction, a selector-repeater terminating the incoming end of said trunk line, means in said selector-repeater for forwarding toll marking in said one-way direction, and means in said selector-repeater for returning answer supervision in a direction which is opposite to said one-way direction.

2. The telephone system of claim 1 wherein said means for forwarding toll marking comprises a control conductor extending in said one-way direction from said selector-repeater to succeeding equipment, and means in said selector-repeater for reversing the polarity of said control conductor, thereby identifying toll calls.

3. A telephone system comprising at least two offices, a one-way trunk line extending between said offices, a selector-repeater, means connecting said selector-repeater directly to the incoming end of said one-way trunk line, means for extending calls over said trunk line and through said selector-repeater in said one-way direction, said selector-repeater having at least two talking brushes and one control brush, and means in said selector-repeater for forwarding a toll in said one-way direction over said control brush.

4. The telephone system of claim 3 and means for transmitting digit pulses over said trunk line from one of said offices to said selector-repeater in the other of said offices, said means for forwarding said toll marking comprising a slow release relay operated responsive to the receipt of said digit pulses by said selector-repeater from said trunk line, a source of two potentials of opposite polarity, said extra brush being normally marked by one of said polarities, and means responsive to said operation of said slow release relay for disconnecting said one polarity and for connecting said other polarity to said control brush.

5. A telephone system comprising a connector, a toll position, a local switch train, means for seizing said connector from either said toll position or from said local switch train, said means for seizing said connector from said toll position comprising a selector-repeater, and means in said selector-repeater for forwarding a toll marking to said connector.

6. The telephone system of claim 5 wherein said means in said selector-repeater for forwarding said toll marking comprises a control conductor and two sources of potential having opposite polarity, means for normally connecting one of said sources of potential to said control conductor, and means for selectively connecting the other of said potentials having opposite polarity to said control conductor.

7. The telephone system of claim 6 and means for operating said potential switching means responsive to the receipt of digit pulses by said selector-repeater from said toll position.

8. A selector-repeater having a two-motion switch associated therewith comprising a set of brushes including at least one control brush and a plurality of bank contacts, said bank contacts being divided into a plurality of levels, means responsive to the direction of said switch to certain of said levels for causing it to hunt-out to overflow, a source of potential having opposite polarities, means in said selector-repeater for connecting said source so that one of said polarities normally marks said control brush, and toll marking means for briefly connecting said source so that the other of said polarities marks said control brush.

9. A selector-repeater having a two-motion switch associated therewith comprising a set of brushes including at least one control brush and a plurality of bank contacts, said bank contacts being divided into a plurality of levels, means responsive to the direction of said switch to certain of said levels for causing said switch to hunt-out to overflow, a source of potential having at least two characteristics, means in said selector-repeater for connecting said source so that one of said characteristics normally marks said control brush, toll marking means for briefly connecting said source so that the other of said characteristics marks said control brush, and means in said selector-repeater for returning answer supervision to preceding equipment.

10. A selector-repeater having a two-motion switch associated therewith comprising a set of brushes including at least one control brush, a plurality of bank contacts, said bank contacts being divided into levels, means effective on certain of said levels for causing said switch to operate in its secondary motion at one time and for causing it to drop-back at another time, a source of potential having at least two characteristics, means in said selector-repeater for connecting said source so that one of said characteristics normally marks said control brush, toll marking means for briefly connecting said source so that the other of said characteristics marks said control brush, and means in said selector-repeater for returning answer supervision to preceding equipment.

11. A two-motion, step-by-step selector-repeater comprising a set of brushes, a terminal bank divided into levels, means for advancing said brushes to select any level, said means controlled by directive impulse trains incoming to said selector, means for advancing the brushes in any level to select an unguarded set of terminals, a plurality of marking means individually effective upon selection of a corresponding individual level, means comprising at least one of said marking means for causing said selector-repeater to drop back upon selection of the level with which said one marking means is operatively associated in response to a train of impulses, means comprising other of said marking means effective upon selection of a particular level for causing said selector-repeater to hunt out to overflow, means comprising still other of said marking means effective upon selection of another level for causing said selector-repeater to operate in its secondary direction or to drop back, depending upon the order in which said directive impulse trains are received, means in said selector-repeater for forwarding a toll-marking to succeeding equipment during the establishment of a call, and means in said selector-repeater for returning answer supervision to preceding equipment after a call is answered.

12. The selector-repeater of claim 11 and a source of potential having opposite polarities, and means in said selector-repeater for connecting said source so that one of said polarities normally marks one of said brushes, said means for transmitting toll-marking comprising means for briefly connecting said source so that the other of said polarities marks said one brush.

13. A selector-repeater for use in automatic telephone systems wherein the switch can be operated to any of a plurality of levels in a primary direction followed by operation in a secondary direction to select an idle set of terminals, means for transmitting digital impulses to said switch, means responsive to digital impulses comprising a first plurality of impulses for operating said switch in its primary direction to a particular level, means responsive to the advance of said switch to said particular level for causing said switch to drop-back, means responsive to digital impulses comprising another plurality of impulses for operating said switch in its primary direction to a different level, means responsive to the advance of said switch to said different level for causing said switch to drop-back or to operate in its secondary direction depending upon the order in which digit pulse trains are received by said selector-repeater and means in said selector-repeater for forwarding a toll-marking after operation of said switch in said secondary direction.

14. In an automatic telephone system, means for extending a plurality of different types of calls to said system, each type of said calls being distinguished by characteristic directory numbers, means comprising a selector-repeater for identifying the types of said calls responsive to said characteristics of said directory numbers, said last-named means comprising means for causing said selector-repeater to drop-back responsive to receipt of digit pulse trains indicating a directory number that is characteristic of one type of call, means for causing said selector-repeater to hunt-out to overflow responsive to receipt of digit pulse trains indicating a directory number that is characteristic of another type of call, means for causing said selector-repeater to operate in its secondary direction responsive to receipt of a given digit pulse train if said given digit pulse train is in a correct characteristic position in a directory number and means for causing said selector-repeater to hunt-out to overflow responsive to receipt of said given digit pulse train if said given digit pulse train is in an incorrect characteristic position in a directory number, means in said selector-repeater for forwarding toll-markings to succeeding equipment after said operation of said switch in its secondary direction, and means in said selector-repeater for returning answer supervision to preceding equipment after a call is answered.

15. Switching apparatus for use in an automatic telephone system including a two-motion, step-by-step switch having access to terminal bank contacts divided into levels, means responsive to digit pulse trains for causing said switch to select particular levels, means associated with said switch for causing said switch to drop-back from certain levels corresponding to dialed digits of certain called numbers including toll numbers, means associated with said switch for causing said switch to operate in its secondary direction on other levels corresponding to dialed digits of certain called numbers, means associated with said switch for repeating digit pulse trains received after operation of said switch in its secondary direction, and means associated with said switch for forwarding a toll marking responsive to operation of said last-named means.

16. The switching apparatus of claim 15 and means associated with said switch for causing said switch to hunt-out to overflow on certain levels corresponding to dialed digits of other called numbers.

17. The switching apparatus of claim 15 and means associated with said switch for causing said switch to drop-back from said other levels if there has been a dialing error.

18. The switching apparatus of claim 15 and means associated with said switch for causing said switch to hunt-out to overflow on said other levels if there has been a dialing error.

References Cited in the file of this patent

UNITED STATES PATENTS

| | | |
|---|---|---|
| 2,642,498 | Riddell et al. | June 15, 1953 |
| 2,658,949 | Pharis | Nov. 10, 1953 |
| 2,670,406 | Elliott | Feb. 23, 1954 |
| 2,691,066 | Fisher | Oct. 5, 1954 |

UNITED STATES PATENT OFFICE

CERTIFICATE OF CORRECTION

Patent No. 2,831,063 April 15, 1958

William W. Pharis

It is hereby certified that error appears in the printed specificatio of the above numbered patent requiring correction and that the said Letter Patent should read as corrected below.

Column 2, line 34, for "arragement" read -- arrangement --; column 3, line 6, strike out "102 to the third level thereby gving access to selector column 7, line 29, for "wil" read -- will --; line 38, after "release dela insert -- relay --; column 8, line 21, for "noramlly" read -- normally --; line 34, for "conducotr" read -- conductor --; line 67, for "subscrber" read -- subscriber --; column 9, line 23, for "band" read -- bank --; lin 27, for "circiut" read -- circuit --; column 11, line 58, for "entiled" read -- entitled --; column 13, line 30, after "toll" insert -- marking --.

Signed and sealed this 12th day of August 1958.

(SEAL)
Attest:

KARL H. AXLINE
Attesting Officer

ROBERT C. WATSON
Commissioner of Patent